2,903,443

PROCESS FOR THE PREPARATION OF AMINO-KETOSES AND PRODUCTS OBTAINED THEREBY

Jean Druey, Riehen, and Georg Huber, Allschwil, Switzerland, assignors to Ciba Pharmaceutical Products Inc., Summit, N.J.

No Drawing. Application January 14, 1957
Serial No. 633,826

Claims priority, application Switzerland January 20, 1956

20 Claims. (Cl. 260—211)

This invention relates to a new process for the preparation of amino-ketones. More particularly it concerns a new process for the preparation of primary 1-amino-2-ketoses, preferably 1-amino-2-ketohexoses, such as 1-amino-1-desoxy-D-fructose (D-isoglucosamine), or 1-amino-1-desoxy-D-sorbose, and their acyl derivatives, such as acetyl derivatives and salts of these compounds.

1-amino-2-ketoses are known. Thus, D-isoglucosamine was first described by E. Fischer, Ber. deutsch, chem. Ges., vol. 19, page 1920 (1886). However, it is obtained in a very poor yield by the process described for obtaining it from D-glucoseosazone. 1-amino-2-ketoses are valuable intermediate products. Thus, they can be converted by the process described in our copending application Serial No. 633,827 filed on even date herewith into 2-amino-aldoses, which in turn can be converted by acylation into the pharmacologically useful N-nicotinoyl-derivatives or other N-acyl-derivatives according to our copending application Serial No. 633,825, filed on even date herewith. The acyl derivatives, such as acetyl derivatives of 1-amino-2-ketoses are new. Besides being intermediates for the above reaction they have an inhibiting effect on cell division, and can be used for controlling the growth of plants. Especially active is the hexaacetyl-1-amino-1-desoxy-D-fructose.

The process of the present invention is based on the unexpected observation that primary 1-amino-2-ketoses their acyl derivatives or salts thereof can be obtained in excellent yield by treating a 1-(N:N-bis-arylmethyl-amino)-2-ketose with a hydrogenating agent, and, if desired, acylating the resulting 1-amino-2-ketose or hydrolyzing any resulting O-acyl-1-amino-ketose and/or converting the resulting compound, if desired, into a salt thereof. There are preferably used as starting materials 1-(N:N-bis-aryl-methylamino)-2-ketoses of which the amino groups contain unsubstituted or substituted phenyl-, diphenyl- or triphenyl-methyl groups, and in the first place 1-(N:N-dibenzylamino)-ketoses. The hydroxyl groups of the ketoses used as starting materials may be unsubstituted or one or more of these groups may be substituted, for example, acylated e.g. acetylated. The hydrogenation is carried out with the aid of catalytically activated hydrogen. It is especially advantageous to work with hydrogen in the presence of a hydrogenating catalyst of the eighth group of the periodic system, for example, a palladium catalyst. The subsequent acylation, which may concern free hydroxyl groups only or the amino group too, and the cleavage of O-acyl groups are carried out in the manner customary in sugar chemistry.

The starting materials may be used in the form of their bases or salts, as far as they are new they can be made by methods in themselves known. Thus, for example, the starting materials used in the present process can be obtained by subjecting aldoses, especially aldohexoses to the Amadori rearrangement with appropriate amines (M. Amadori, Chemisches Zentralblatt, 32/II, 33 [1929]).

The reaction may be carried out at the ordinary or a raised temperature, advantageously in the presence of a solvent in a closed vessel under atmospheric or superatmospheric pressure.

Depending on the procedure used the 1-amino-2-ketoses are obtained in the form of their bases or salts. From the salts the free amine bases can be obtained in the usual manner. From the bases salts can be obtained by reaction with acids, for example, hydrohalic acids, sulphuric acid, nitric acid, phosphoric acid, thiocyanic acid, acetic acid, propionic acid, oxalic acid, malonic acid, succinic acid, malic acid, methane sulphonic acid, ethane sulphonic acid, oxyethane sulphonic acid, benzene or toluene sulphonic acid.

The following examples illustrate the invention:

*Example 1*

57.6 grams of 1-dibenzylamino-1-desoxy-D-fructose are hydrogenated in 800 cc. of alcohol of 95% strength and 50 cc. of glacial acetic acid in the presence of 10 grams of palladium black of 10 percent strength at room temperature and under atmospheric pressure. 7.2 litres of hydrogen are taken up in about 5 hours, hydrogenation slowing down considerably. After being heated to prevent premature crystallisation, the reaction mixture is filtered with suction, the solution is evaporated to half the original amount in vacuo and the resulting concentrate is mixed with ether. 36 grams of 1-amino-1-desoxy-D-fructose acetate (D-isoglucosamine acetate) crystallise out; the product melts at 143–145° C. and has the specific rotation $[\alpha]_D^{23}$ —63° in pyridine. 1-amino-1-desoxy-D-fructose acetate can be converted into the hydrochloride by treatment with methanolic hydrochloric acid; the product melts at 120–122° C. Acetylation with pyridine acetic acid anhydride for one day at room temperature and working up in the customary manner yields hexaacetyl-1-amino-1-desoxy-D-fructose; the latter melts at 139–140° C. and has the specific rotation $[\alpha]_D^{22}$ —7° in chloroform. 1-amino-1-desoxy-D-fructose forms the same phenyl-osazone as glucose, reduces Fehling's solution and gives a positive methylene blue test. It shows no lowering of the melting point when fused together with the compound obtained by the process of E. Fischer.

*Example 2*

20 grams of D-galactose are boiled with 50 cc. of ethanol and 30 cc. of dibenzylamine for 1 hour under reflux. 1 gram of ammonium chloride is then added and the whole is boiled under reflux for 4 hours. The solution is filtered hot and kept at room temperature. The first crystals, 1.44 grams, melting at 250–255° C., are filtered with suction and the remaining mother liquor is kept at 0° C. 12 grams of 1-desoxy-1-dibenzyl-amino-D-sorbose melting at 140–142° C. crystallise out, this gives a positive methylene blue test and reduces Fehling's solution. 10.8 grams of the above substance are catalytically hydrogenated in 160 cc. of alcohol of 95% strength and 80 cc. of glacial acetic acid with 2.5 grams of palladium black of 10% strength. In 6.5 hours 1.33 litres of hydrogen are taken up, hydrogenation then slowing down considerably. The reaction mixture is filtered with suction and evaporated under reduced pressure. The resulting syrup is dissolved in a little water and clarified with active charcoal. The reaction mass is then evaporated again under reduced pressure. 7 grams of 1-amino-1-desoxy-D-sorbose are obtained which give a positive methylene blue test, reduce Fehling's solution and yield the same phenyl osazone as D-galactose.

What is claimed is:

1. In a process for the preparation of 1-amino-ketoses,

1. In a process for the preparation of 1-amino-ketoses the step which comprises reacting a 1-(N:N-bis-arylmethyl-amino)-2-ketose with a hydrogenating agent.

2. In a process for the preparation of 1-amino-ketoses the step which comprises reacting a 1-(N:N-dibenzyl)-amino-ketose with a hydrogenating agent.

3. In a process for the preparation of 1-amino-ketoses, the step which comprises reacting a 1-(N:N-bis-arylmethyl-amino)-2-keto hexose with a hydrogenating agent.

4. In a process for the preparation of 1-amino-ketoses the step which comprises reacting a 1-(N:N-dibenzyl-amino)-2-keto-hexose with a hydrogenating agent.

5. In a process for the preparation of 1-amino-ketoses the step which comprises reacting a 1-(N:N-bis-arylmethyl-amino)-2-ketose with catalytically activated hydrogen.

6. In a process for the preparation of 1-amino-ketoses, the step which comprises reacting a 1-(N:N-bisarylmethyl-amino)-2-ketohexose with catalytically activated hydrogen.

7. In a process for the preparation of 1-amino-ketoses, the step which comprises reacting a 1-(N:N-dibenzyl-amino)-2-ketohexose with catalytically activated hydrogen.

8. In a process for the preparation of 1-amino-ketoses, the step which comprises reacting 1-(N:N-dibenzyl-amino)-1-desoxy-D-fructose with catalytically activated hydrogen.

9. A process for the preparation of acetyl derivatives of 1-amino-ketoses which comprises reacting a 1-(N:N-bisarylmethyl-amino)-2-ketose with a hydrogenating agent and acetylating the 1-amino-1-desoxy-ketose formed.

10. A process for the preparation of acetyl derivatives of 1-amino-ketoses which comprises reacting a 1-(N:N-dibenzyl-amino)-2-ketohexose with catalytically activated hydrogen and acetylating the 1-amino-1-desoxy-2-keto-hexose formed with acetic acid anhydride.

11. A process for the preparation of acetyl derivatives of 1-amino-ketoses which comprises reacting 1-(N:N-dibenzyl-amino)-1-desoxy-D-fructose with catalytically activated hydrogen and acetylating the 1-amino-1-desoxy-D-fructose formed with acetic acid anhydride.

12. Acetylated 1-amino-2-ketoses.

13. Acetylated 1-amino-2-ketohexoses.

14. Acetylated 1-amino-1-desoxy-D-fructose.

15. Hexaacetyl 1-amino-1-desoxy-D-fructose.

16. Process of claim 5 wherein the catalytically activated hydrogen is activated by a hydrogenating catalyst of the eighth group of the periodic system.

17. Process of claim 5 wherein the catalytically activated hydrogen is activated by palladium.

18. Process of claim 6 wherein the catalytically activated hydrogen is activated by a hydrogenating catalyst of the eighth group of the periodic system.

19. Process of claim 7 wherein the catalytically activated hydrogen is activated by a hydrogenating catalyst of the eighth group of the periodic system.

20. Process of claim 8 wherein the catalytically activated hydrogen is activated by a hydrogenating catalyst of the eighth group of the periodic system.

References Cited in the file of this patent

UNITED STATES PATENTS 2,715,123   Hodge _____ Aug. 9, 1955
2,792,388   Ruelius _____ May 14, 1957

OTHER REFERENCES

Pigman et al.: "Carbohydrate Chemistry," 1948, publ. by Academic Press Inc. (N.Y.), pp. 385, 386, 419 and 420.

Chemical Abstracts, vol. 48, pp. 1281($a$) and 1282($b$).